US009099250B2

(12) United States Patent
Chae et al.

(10) Patent No.: US 9,099,250 B2
(45) Date of Patent: Aug. 4, 2015

(54) MULTILAYER CERAMIC CAPACITOR TO BE EMBEDDED IN BOARD, METHOD OF MANUFACTURING THE SAME, AND METHOD OF MANUFACTURING BOARD HAVING MULTILAYER CERAMIC CAPACITOR EMBEDDED THEREIN

(71) Applicant: SAMSUNG ELECTRO-MECHANICS CO., LTD., Gyunggi-do (KR)

(72) Inventors: Eun Hyuk Chae, Gyunggi-do (KR); Jin Man Jung, Gyunggi-do (KR); Byoung Hwa Lee, Gyunggi-do (KR); Jin Woo Lee, Gyunggi-do (KR); Kyu Ree Kim, Gyunggi-do (KR)

(73) Assignee: SAMSUNG ELECTRO-MECHANICS CO., LTD., Suwon, Gyeonggi-Do (KR)

( * ) Notice: Subject to any disclaimer, the term of this patent is extended or adjusted under 35 U.S.C. 154(b) by 91 days.

(21) Appl. No.: 14/067,912

(22) Filed: Oct. 30, 2013

(65) Prior Publication Data

US 2015/0022943 A1    Jan. 22, 2015

(30) Foreign Application Priority Data

Jul. 17, 2013    (KR) .................. 10-2013-0084170

(51) Int. Cl.
*H01G 4/30*    (2006.01)
(52) U.S. Cl.
CPC ..................................... *H01G 4/30* (2013.01)
(58) Field of Classification Search
USPC ............... 361/301.4, 301.2, 303–305, 306.1, 361/306.3, 309–310, 311–313, 321.1, 321.2
See application file for complete search history.

(56) References Cited

U.S. PATENT DOCUMENTS 6,377,439 B1 *   4/2002   Sekidou et al. ............... 361/303
7,206,187 B2 *   4/2007   Satou ........................... 361/309

(Continued)

FOREIGN PATENT DOCUMENTS

JP    2005-123407 A    5/2005
JP    2012-028465 A    2/2012

(Continued)

OTHER PUBLICATIONS

Examination Report Taiwanese Patent Application No. 102137443 dated Sep. 16, 2014 with English translation.
Notice of Office Action Japanese Patent Application No. 2013-220991 dated Dec. 2, 2014 with English translation.

*Primary Examiner* — Nguyen T Ha
(74) *Attorney, Agent, or Firm* — McDermott Will & Emery LLP

(57) ABSTRACT

There is provided a multilayer ceramic capacitor to be embedded in a board, including: a ceramic body; first and second internal electrodes alternately exposed through end surfaces of the ceramic body; first and second external electrodes formed on end surfaces of the ceramic body; and first and second plating layers enclosing the first and second external electrodes, wherein when distance from one end of bands of the first or second external electrode to the other end thereof is 'A' and distance between points at which a virtual line drawn from a point vertically spaced apart from a surface of the first or second plating layer at a point ½×A from one end of the bands inwardly of the ceramic body by 3 μm in length direction of the ceramic body intersects points on the surface of the first or second plating layer is 'B,' B/A≥0.6.

10 Claims, 3 Drawing Sheets

(56) References Cited

U.S. PATENT DOCUMENTS

| | | | |
|---|---|---|---|
| 7,319,582 B2 * | 1/2008 | Takashima et al. | 361/303 |
| 7,436,650 B2 * | 10/2008 | Oguni et al. | 361/321.2 |
| 8,351,180 B1 * | 1/2013 | Ahn et al. | 361/321.2 |
| 8,941,973 B2 * | 1/2015 | Kim et al. | 361/303 |
| 2011/0266040 A1 | 11/2011 | Kim et al. | |
| 2012/0152604 A1 | 6/2012 | Ahn et al. | |

FOREIGN PATENT DOCUMENTS

| | | |
|---|---|---|
| KR | 10-2011-0122008 | 11/2011 |
| TW | 485393 | 5/2002 |
| TW | 201250740 A1 | 12/2012 |

* cited by examiner

MULTILAYER CERAMIC CAPACITOR TO BE EMBEDDED IN BOARD, METHOD OF MANUFACTURING THE SAME, AND METHOD OF MANUFACTURING BOARD HAVING MULTILAYER CERAMIC CAPACITOR EMBEDDED THEREIN

CROSS-REFERENCE TO RELATED APPLICATION

This application claims the benefit of Korean Patent Application No. 10-2013-0084170 filed on Jul. 17, 2013, with the Korean Intellectual Property Office, the disclosure of which is incorporated herein by reference.

BACKGROUND OF THE INVENTION

1. Field of the Invention

The present invention relates to a multilayer ceramic capacitor to be embedded in a board, a method of manufacturing the same, and a method of manufacturing a board having a multilayer ceramic capacitor embedded therein.

2. Description of the Related Art

A multilayer ceramic capacitor (MLCC), a multilayer chip electronic component, is a chip-type condenser mounted on printed circuit boards of various electronic products including display devices such as liquid crystal displays (LCDs), plasma display panels (PDPs), and the like, computers, personal digital assistants (PDAs), cellular phones, and the like, to charge and discharge electricity.

Multilayer ceramic capacitors (MLCCs) may be used as components of various electronic devices due to advantages thereof such as a small size, high capacitance, ease of mounting, and the like.

Recently, as the performance of portable smart devices such as smartphones, tablet personal computers (PCs), or the like, has improved, a driving speed of an application processor (AP) used for calculations has increased. When the driving speed of the AP is increased as described above, high frequency current should be rapidly supplied to the AP.

The multilayer ceramic capacitor serves to supply current to the AP. Therefore, in order to rapidly supply the high frequency current as described above, a multilayer ceramic capacitor having low equivalent series inductance (ESL) should be used or a multilayer ceramic capacitor should be embedded in a board to maximally decrease a distance between the multilayer ceramic capacitor and the AP.

In the former case in which a low ESL multilayer ceramic capacitor is used, a structural problem may occur. Therefore, recently, research into the latter case in which the multilayer ceramic capacitor is embedded in the board has been actively conducted.

In the multilayer ceramic capacitor to be embedded in the board, a metal layer mainly formed of copper (Cu) is formed on a surface of an external electrode.

After the multilayer ceramic capacitor is embedded in the board, the metal layer serves to electrically connect a circuit on the board to the multilayer ceramic capacitor by a via hole process using a laser beam and a plating process of filling the via hole with copper.

After the multilayer ceramic capacitor is embedded in the board, the via hole is formed by penetrating through a resin layer using the laser beam so that the external electrode of the multilayer ceramic capacitor is exposed, and the via hole is filled with copper by the plating process so that an external wiring and the external electrode of the multilayer ceramic capacitor are electrically connected to each other.

In this case, the laser beam may be absorbed due to a glass component in the external electrode while penetrating through a plating layer of the multilayer ceramic capacitor, thereby directly damaging a ceramic body. Therefore, the plating layer should be thick, and the external electrode should have a uniform thickness and a flat surface.

When the thickness of the external electrode is not uniform and the surface of the external electrode is not flat, scattered reflections of the laser beam may be generated on a surface of the plating layer to cause damage to a resin portion around the plating layer. Therefore, an inner portion of the via hole may be non-uniformly plated at the time of performing the plating process to cause cracking, or the like, in a via electrode.

Meanwhile, when a space is generated between a chip and an epoxy layer after a built-up film is attached and compressed, delamination may be generated. Therefore, it is important to closely bond the built-up film to the chip.

In addition, the ceramic body and the external electrode of the multilayer ceramic capacitor may have a step therebetween, generated by a thickness of the external electrode. In this case, when the step is excessively large, a space between the multilayer ceramic capacitor and the built-up film is increased, so that the possibility of delamination is increased.

Therefore, in order to decrease the delamination, the thickness of the external electrode or the thickness of the plating layer is decreased. In this case, the ceramic body may be damaged during laser processing, and thus, there has been a limitation in decreasing the thickness of the external electrode or the thickness of the plating layer.

Therefore, in order to decrease the delamination due to the step between the external electrode and the ceramic body, the thickness of the external electrode may be gradually decreased in order not to form a steep step at a distal end portion of the external electrode.

The multilayer ceramic capacitor to be embedded in the board is thinner than the multilayer ceramic capacitor which is not to be embedded in the board, but is to be mounted thereon. In the case of the multilayer ceramic capacitor to be embedded in the board, when a thickness of the ceramic body is excessively thin, a paste is thinly applied to an exposed surface of an internal electrode, such that the external electrode is formed. Therefore, high temperature reliability may be degraded due to permeation of a plating solution.

In addition, when viscosity of the external electrode is increased in order to increase a thickness of the exposed surface of the internal electrode, a band surface may be increased in terms of thickness, such that a flatness of the band surface is decreased and an angle of a distal end portion is increased, thereby causing the above-mentioned cracking in the via electrode or delamination.

The following Patent Document 1 includes a ceramic body, an external electrode, and a plating layer, and does not specifically limit numerical values with respect to a flatness of the plating layer.

RELATED ART DOCUMENT (Patent Document 1) Korean Patent Laid-Open Publication No. 10-2011-0122008

SUMMARY OF THE INVENTION

An aspect of the present invention provides a multilayer ceramic capacitor to be embedded in a board, capable of preventing damage to a ceramic body at the time of processing a via hole using a laser beam and preventing delamination between the board and the multilayer ceramic capacitor embedded in the board.

According to an aspect of the present invention, there is provided a multilayer ceramic capacitor to be embedded in a board, including: a ceramic body having a plurality of dielectric layers laminated therein; a plurality of first and second internal electrodes alternately exposed through both end surfaces of the ceramic body, having each of the dielectric layers interposed therebetween; first and second external electrodes formed on both end surfaces of the ceramic body and electrically connected to the first and second internal electrodes, respectively; and first and second plating layers enclosing the first and second external electrodes, wherein when a distance from one end of bands of the first or second external electrode to the other end thereof is defined as A and a distance between points at which a virtual line drawn from a point vertically spaced apart from a surface of the first or second plating layer at a point ½×A from one end of the bands inwardly of the ceramic body by 3 μm in a length direction of the ceramic body intersects points on the surface of the first or second plating layer is defined as B, B/A≥0.6 is satisfied.

When one end of the bands of the first or second external electrode is defined as P, a point spaced apart from P by ¹⁄₁₀×A is defined as Q, and a point at which a virtual line vertically drawn from Q in a thickness direction of the ceramic body intersects a point on the surface of the first or second plating layer is defined as R, an angle (θ) formed by line PQ and line PR may be equal to or smaller than 35 degrees.

The ceramic body may have a thickness of 80 μm or less.

According to another aspect of the present invention, there is provided a method of manufacturing a multilayer ceramic capacitor to be embedded in a board, the method including: preparing a plurality of ceramic green sheets; forming a plurality of first and second internal electrodes on the respective ceramic green sheets using a conductive paste; forming a multilayer body by alternately stacking the plurality of ceramic green sheets having the first and second internal electrodes formed thereon in a thickness direction of the multilayer body; forming a ceramic body by sintering the multilayer body; forming first and second external electrodes on both end surfaces of the ceramic body so as to contact the exposed portions of the first and second internal electrodes to thereby be electrically connected to the first and second internal electrodes, respectively; and forming first and second plating layers enclosing the first and second external electrodes, wherein when a distance from one end of bands of the first or second external electrode to the other end thereof is defined as A and a distance between points at which a virtual line drawn from a point vertically spaced apart from a surface of the first or second plating layer at a point ½×A from one end of the bands inwardly of the ceramic body by 3 μm in a length direction of the ceramic body intersects points on the surface of the first or second plating layer is defined as B, B/A≥0.6 is satisfied.

The forming of the first and second external electrodes may include: dipping both ends of the ceramic body in a paste to form the first and second external electrodes; and blowing air toward the bands of the first and second external electrodes.

In the blowing of the air, a speed and a direction of the blown air may be adjusted to control surface flatness of the bands of the first and second external electrodes and angles between the ceramic body and the first and second external electrodes.

According to another aspect of the present invention, there is provided a method of manufacturing a board having a multilayer ceramic capacitor embedded therein, the method including: preparing the multilayer ceramic capacitor; forming a cavity in the board; mounting the multilayer ceramic capacitor in the cavity; attaching a built-up film to the board and compressing the built-up film at a high temperature and a high pressure, the built-up film being formed of an epoxy material; forming via holes in the board such that external electrodes of the multilayer ceramic capacitor are exposed; and filling the via holes with a conductive material to manufacture the board having the multilayer ceramic capacitor embedded therein, wherein in the multilayer ceramic capacitor, when a distance from one end of bands of the first or second external electrode to the other end thereof is defined as A and a distance between points at which a virtual line drawn from a point vertically spaced apart from a surface of a first or second plating layer at a point ½×A from one end of the bands inwardly of a ceramic body by 3 μm in a length direction of the ceramic body intersects points on the surface of the first or second plating layer is defined as B, B/A≥0.6 is satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
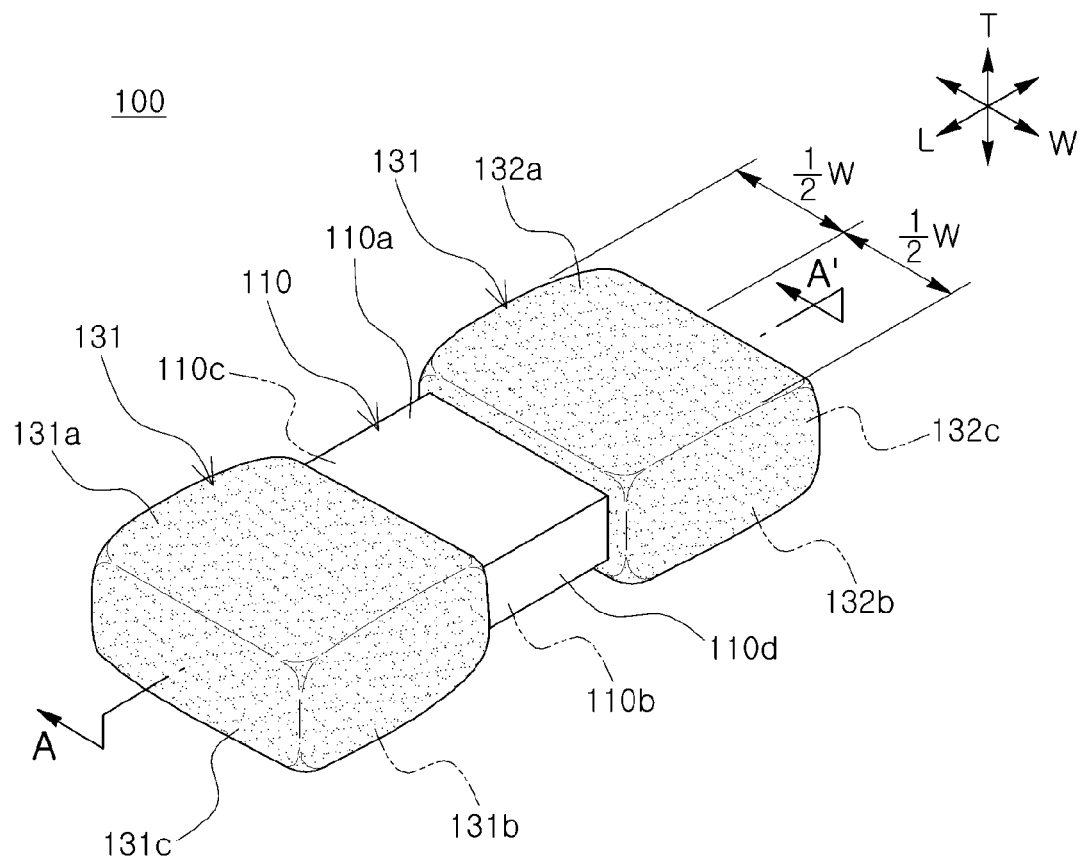
FIG. 1 is a perspective view schematically showing a multilayer ceramic capacitor according to an embodiment of the present invention, except for a metal layer.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Directions of a hexahedral ceramic body will be defined in order to clearly describe an embodiment of the invention. L, W and T shown throughout the drawings refer to a length direction, a width direction, and a thickness direction, respectively. Here, the thickness direction may be the same as a direction in which dielectric layers are laminated.

Further, in the present embodiment, for convenience of explanation, both end surfaces of a ceramic body refer to surfaces on which first and second external electrodes are formed in the length direction of the ceramic body, and side surfaces thereof refer to surfaces vertically intersecting with both end surfaces.

Figure 2:
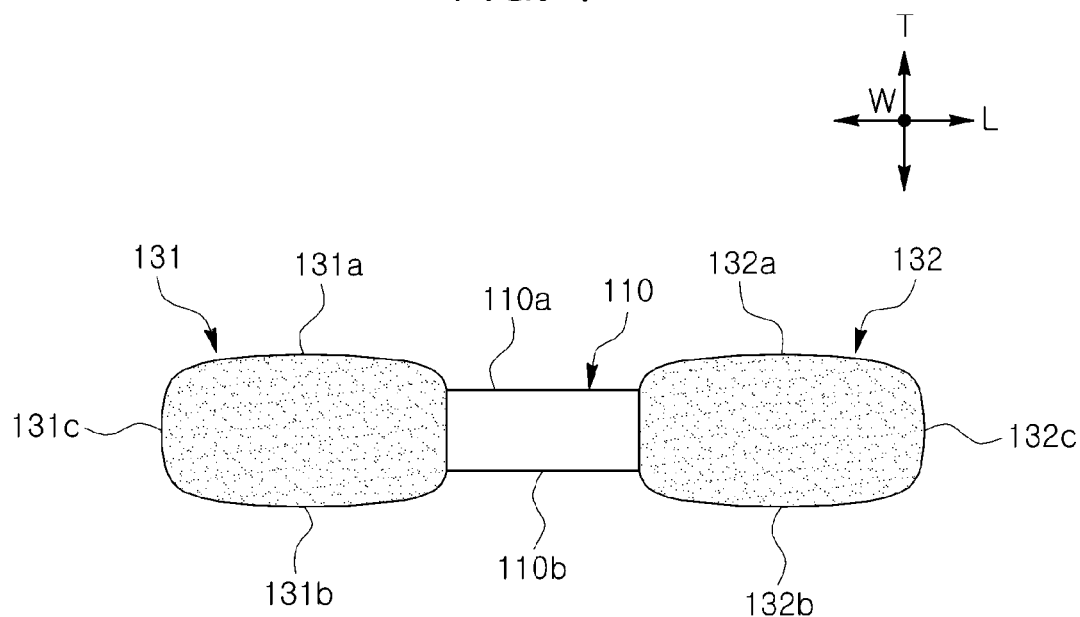
FIG. 2 is a side view of FIG. 1.

FIG. 1 is a perspective view schematically showing a multilayer ceramic capacitor according to an embodiment of the invention, except for a metal layer; FIG. 2 is a side view of FIG. 1; and FIG. 3 is a lateral cross-sectional view of the multilayer ceramic capacitor according to the embodiment of the invention.

Figure 3:
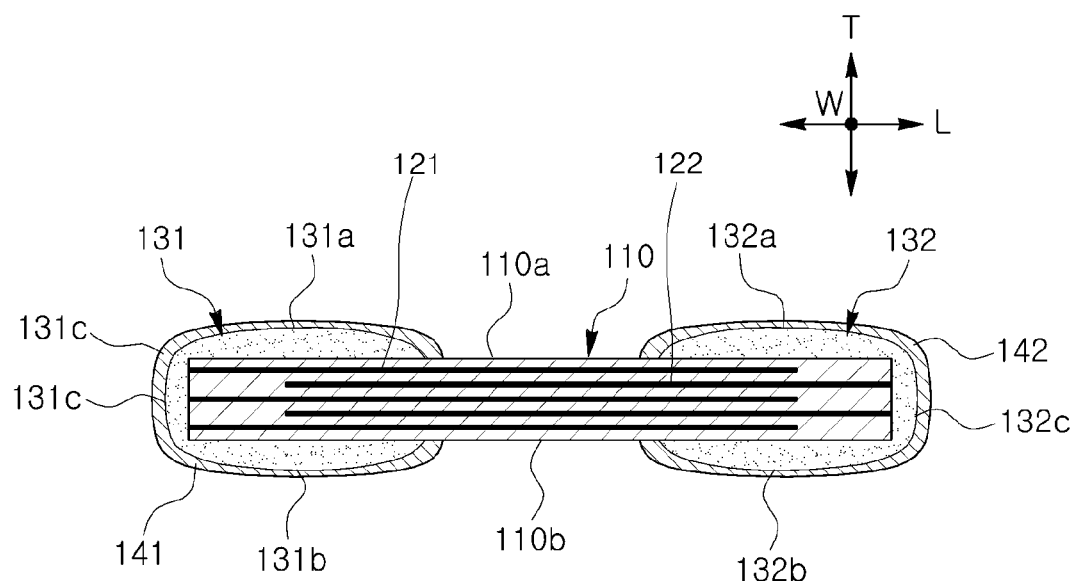
FIG. 3 is a lateral cross-sectional view of the multilayer ceramic capacitor according to the embodiment of the present invention.

Referring to FIGS. 1 through 3, a multilayer ceramic capacitor 100 according to the embodiment of the invention may include a ceramic body 110, first and second internal electrodes 121 and 122, first and second external electrodes 131 and 132, and first and second plating layers 141 and 142.

The ceramic body 110 may be formed as a hexahedron having first and second main surfaces 110a and 110b and first and second side surfaces 110c and 110d. The first and second main surfaces 110a and 110b may be extended in the length direction L and the width direction W. The first and second side surfaces 110c and 110d may be extended in the thickness direction T and the length direction L.

The ceramic body 110 may be formed by stacking a plurality of dielectric layers 111 in the thickness direction T and then sintering the plurality of dielectric layers 111. The ceramic body 110 may be formed to have a thickness of 80 µm or less. The shape and dimension of the ceramic body 110 and the number of dielectric layers 111 are not limited to the present embodiment shown in FIGS. 1 to 3.

The plurality of dielectric layers 111 configuring the ceramic body 110 may be in a sintered state. Adjacent dielectric layers 111 may be integrated with each other so that boundaries therebetween may not be readily apparent without using a scanning electron microscope (SEM).

The ceramic body 110 may include an active region, contributing to forming capacitance of the multilayer ceramic capacitor, and upper and lower margin portions formed in upper and lower portions of the active region, respectively, to prevent damage to the first and second internal electrodes 121 and 122 due to physical or chemical stress.

A thickness of the dielectric layer 111 may be arbitrarily changed in accordance with a capacitance design of the multilayer ceramic capacitor 100. The dielectric layer 111 may include ceramic powder having high permittivity, for example, barium titanate ($BaTiO_3$) based powder or strontium titanate ($SrTiO_3$) based powder. However, the invention is not limited thereto.

The first and second internal electrodes 121 and 122, a pair of electrodes having opposite polarities, may be formed by printing a conductive paste including a conductive metal at a predetermined thickness on the plurality of dielectric layers 111 stacked in the thickness direction T while alternately exposed through both end surfaces of the ceramic body 110 in the direction in which the dielectric layers 111 are stacked. The first and second internal electrodes 121 and 122 may be electrically insulated from each other by the dielectric layer 111 disposed therebetween.

That is, the first and second internal electrodes 121 and 122 may be electrically connected to the first and second external electrodes 131 and 132 formed on both end surfaces of the ceramic body 110 through portions thereof alternately exposed to both end surfaces of the ceramic body 110, respectively.

Therefore, when voltage is applied to the first and second external electrodes 131 and 132, charges may be accumulated between the first and second internal electrodes 121 and 122 facing each other. In this case, capacitance of the multilayer ceramic capacitor 100 may be in proportion to an area of a region in which the first and second internal electrodes 121 and 122 are overlapped with each other.

Widths of the first and second internal electrodes 121 and 122 may be determined depending on use thereof. For example, the widths of the first and second internal electrodes 121 and 122 may be determined to be in a range of 0.2 µm to 1.0 µm in consideration of a size of the ceramic body 110. However, the invention is not limited thereto.

In addition, the conductive metal included in the conductive paste forming the first and second internal electrodes 121 and 122 may be nickel (Ni), copper (Cu), palladium (Pd), or an alloy thereof. However, the invention is not limited thereto.

In addition, as a method of printing the conductive paste, a screen printing method, a gravure printing method, or the like, may be used. However, the invention is not limited thereto.

The first and second external electrodes 131 and 132 may be formed on both end surfaces of the ceramic body 110 while partially covering upper and lower portions of the ceramic body 110. The first and second external electrodes 131 and 132 may include bands 131a, 131b, 132a, and 132b covering portions of the first and second main surfaces 110a and 110b of the ceramic body 110 and head portions 131c and 132c covering both end surfaces of the ceramic body 110 in the length direction L.

According to the related art, as a method of forming external electrodes, a method of dipping the ceramic body 110 in a paste including a metal component has been mainly used.

However, in the case of the dipping method according to the related art, the paste may be applied to the bands 131a, 131b, 132a, and 132b at a thickness greater than that applied to the head portions 131c and 132c in which the first and second internal electrodes 121 and 122 are exposed, due to interfacial tension of the paste. Therefore, flatness of the bands 131a, 131b, 132a, and 132b of the first and second external electrodes 131 and 132 may be decreased, and angles of distal end portions of the bands 131a, 131b, 132a, and 132b of the first and second external electrodes 131 and 132 may be increased.

Figure 4:
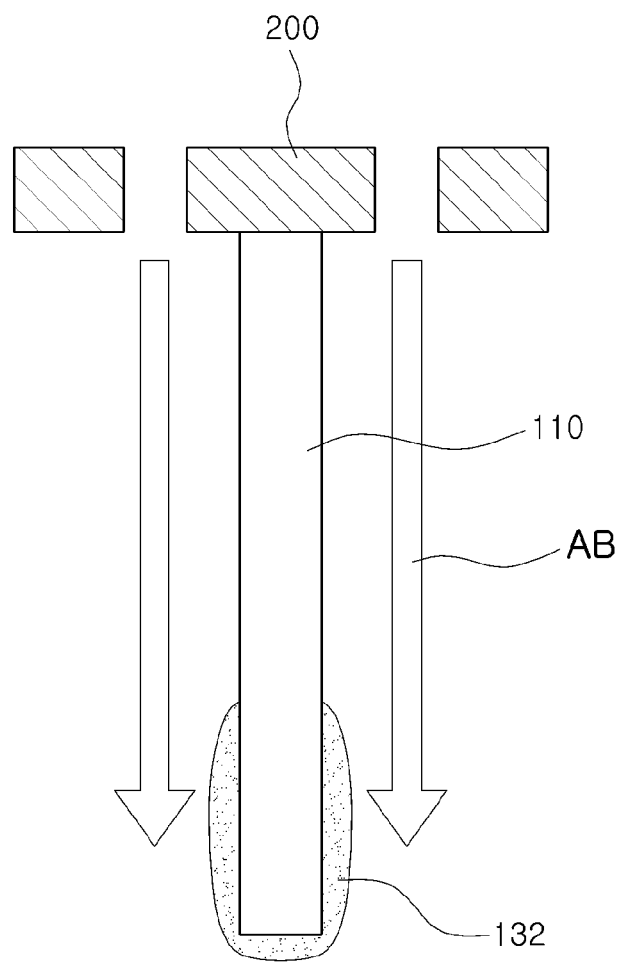
FIG. 4 is a view schematically showing a process of forming an external electrode on an end surface of a ceramic body according to the embodiment of the present invention.

Referring to FIG. 4, in the present embodiment, an air blowing device 200 having a pair of air blowing holes may be disposed on the ceramic body 110. Therefore, after the second external electrode 132 is dipped into the paste, air may be blown toward both bands 132a and 132b of the dipped second external electrode 132 through the air blowing holes.

When the air is blown as described above, the paste applied to the bands 132a and 132b of the second external electrode 132 is moved to the head portion 132c, whereby the flatness of the bands 132a and 132b may be increased without the use of a high viscosity paste, and the angles of the distal end portions of the bands 132a and 132b may be decreased.

Here, the surface flatness of the bands 132a and 132b of the second external electrode 132 and the angle of the second external electrode 132 with respect to the ceramic body 110 may be controlled by adjusting air speed and air direction.

A reference sign AB of FIG. 4 indicates a direction of the air blown downwardly through the air blowing device 200. In addition, although FIG. 6 shows only the second external electrode 132, the surface flatness of the bands 131a and 131b of the first external electrode 131 and an angle of the first external electrode 131 with respect to the ceramic body 110 may also be controlled by the same method.

The first and second plating layers 141 and 142 may be mainly formed of copper (Cu) and be formed on both end surfaces of the ceramic body 110 while covering all of the head portions 131c and 132c and the bands 131a, 131b, 132a, and 132b of the first and second external electrodes 131 and 132.

Figure 5:
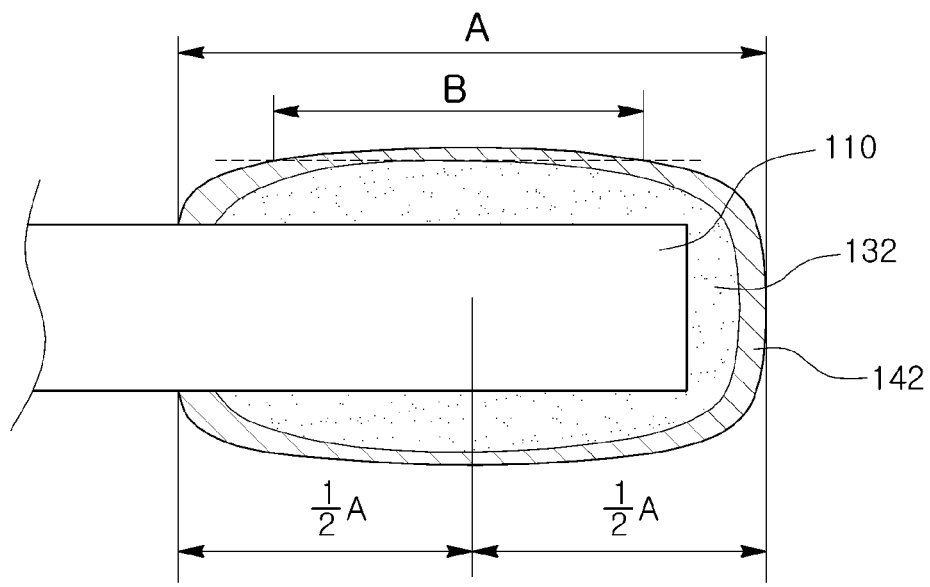
FIGS. 5 and 6 are lateral cross-sectional views showing an end portion of the ceramic body and an external electrode and a plating layer formed on the end portion of the ceramic body in order to illustrate a dimensional relationship between elements included in the multilayer ceramic capacitor of FIG. 3.
Figure 6:
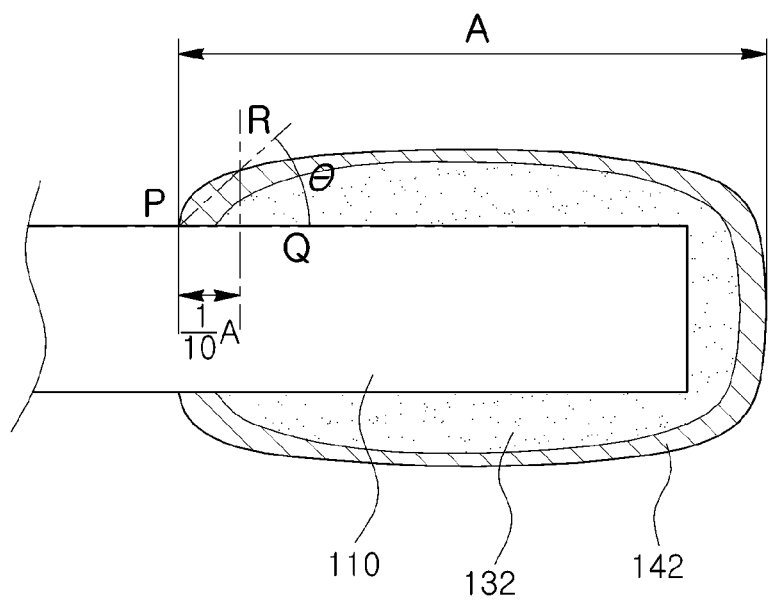

FIGS. 5 and 6 are lateral cross-sectional views showing an end portion of the ceramic body and an external electrode and a plating layer formed around the end portion of the ceramic body in order to illustrate a dimensional relationship between elements included in the multilayer ceramic capacitor of FIG. 3.

Hereinafter, a relationship between flatness of and angles of bands of external electrodes and a frequency of cracking in a via electrode and delamination in the multilayer ceramic capacitor 100 according to the present embodiment will be described with reference to FIGS. 5 and 6.

In a process of embedding the multilayer ceramic capacitor 100 according to the present embodiment in a board, a cavity for embedding the multilayer ceramic capacitor is first formed in the board. Next, adhesive tape is attached to one surface of the board, and the multilayer ceramic capacitor is mounted in the cavity. Next, a built-up film formed of an epoxy material is attached to the board having the multilayer ceramic capacitor embedded therein and is compressed at high temperature and high pressure. Then, the tape attached to one surface of the board is removed, and a built-up film formed of an epoxy resin is attached to the other surface of the board having the multilayer ceramic capacitor embedded therein and is compressed at high temperature and high pressure.

After the multilayer ceramic capacitor 100 manufactured according to the present embodiment was embedded in the board, a via hole was processed using a laser beam and was plated, and a reflow test was performed. Then, flatness depending on a curvature of the external electrode was calculated, and a frequency of cracking generated after a reflow process performed in respective flatness values was obtained.

Here, a distance from one ends of the bands 132a and 132b of the second external electrode 132 to the other ends thereof is defined as A, and a distance between points at which a virtual line drawn from a point vertically spaced apart from a surface of the second plating layer 142 at a point ½×A from one end of the bands 132a and 132 inwardly of the ceramic body 110 by 3 μm in the length direction of the ceramic body 110 intersects points on the surface of the second plating layer 142 is defined as B.

The following Table 1 shows results of a cracking frequency in a via electrode after a reflow process was continuously performed five times on a board on which the plating process was completed, at a temperature of 260° C. for 10 minutes.

TABLE 1

| Band Flatness (B/A, %) | Cracking Frequency in Via Electrode (after a reflow process is performed five times) |
| --- | --- |
| 40 | 85/200 |
| 45 | 45/200 |
| 50 | 15/200 |
| 55 | 3/200 |
| 60 | 0/200 |
| 65 | 0/200 |
| 70 | 0/200 |
| 75 | 0/200 |
| 80 | 0/200 |
| 85 | 0/200 |

Referring to Table 1, it could be appreciated that in the case in which the flatness of the band of the external electrode was 55% or less, cracking occurred in the via electrode. In addition, it could be appreciated that as the flatness was gradually decreased, a crack generation rate in the via electrode was also increased. Therefore, it could be appreciated that flatness of the band of the external electrode in order to avoid cracking in the via electrode may be 60% or more.

Meanwhile, after an angle between the ceramic body 100 and the second external electrode 132 was differently controlled by an air blowing method the second plating layer 142 was formed on the second external electrode 132 to manufacture the multilayer ceramic capacitor 100, the multilayer ceramic capacitor 100 was embedded in the board. Then, a reflow test was performed.

Here, one end of the bands of the second external electrode 142 is defined as P, a point spaced apart from P by $\frac{1}{10} \times A$ is defined as Q, and a point at which a virtual line vertically drawn from Q in the thickness direction of the ceramic body intersects a point on the surface of the second plating layer is defined as R. Angles θ formed by line PQ and line PR were calculated, and a frequency of delamination generated between the ceramic body and the external electrode after a reflow process at respective angles was obtained.

The following Table 2 shows results of delamination frequency by observing a cross section of the board after a reflow process was continuously performed five times on the board on which the plating process was completed, at a temperature of 260° C. for 10 minutes.

TABLE 2

| Angle of Distal End of Band (θ, degrees) | Frequency of Delamination (after a reflow process is performed five times) |
| --- | --- |
| 10 | 0/200 |
| 15 | 0/200 |
| 20 | 0/200 |
| 25 | 0/200 |
| 30 | 0/200 |
| 35 | 0/200 |
| 40 | 3/200 |
| 45 | 18/200 |
| 50 | 27/200 |
| 55 | 42/200 |

Referring to Table 2, in the case in which the angle of the distal end of the band of the external electrode was 35 degrees or less, the delamination was not generated. However, in the case in which the angle of the distal end of the band of the external electrode was 40 degrees or more, the delamination was generated. As the angle of the distal end of the band of the external electrode was increased, the frequency of the delamination was increased. That is, it could be appreciated that the angle θ of the distal end of the external electrode may be 35 degrees or less in order to prevent the delamination.

As set forth above, according to the embodiment of the invention, a ratio of thicknesses among the ceramic body, the external electrodes, and the plating layers in the multilayer ceramic capacitor is controlled to avoid a reduction in reliability and cracking in the ceramic body.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor to be embedded in a board, comprising:
   a ceramic body having a plurality of dielectric layers laminated therein;
   a plurality of first and second internal electrodes alternately exposed through both end surfaces of the ceramic body, having each of the dielectric layers interposed therebetween;
   first and second external electrodes formed on both end surfaces of the ceramic body and electrically connected to the first and second internal electrodes, respectively; and
   first and second plating layers enclosing the first and second external electrodes,
   wherein when a distance from one end of bands of the first or second external electrode to the other end thereof is defined as A and a distance between points at which a virtual line drawn from a point vertically spaced apart from a surface of the first or second plating layer at a point $½×A$ from one end of the bands inwardly of the ceramic body by 3 μm in a length direction of the ceramic body intersects points on the surface of the first or second plating layer is defined as B, B/A≥0.6 is satisfied.

2. The multilayer ceramic capacitor of claim 1, wherein when one end of the bands of the first or second external electrode is defined as P, a point spaced apart from P by $1/10×A$ is defined as Q, and a point at which a virtual line vertically drawn from Q in a thickness direction of the ceramic body intersects a point on the surface of the first or second plating layer is defined as R, an angle (θ) formed by line PQ and line PR is equal to or smaller than 35 degrees.

3. The multilayer ceramic capacitor of claim 1, wherein the ceramic body has a thickness of 80 μm or less.

4. A method of manufacturing a multilayer ceramic capacitor to be embedded in a board, the method comprising:
   preparing a plurality of ceramic green sheets;
   forming a plurality of first and second internal electrodes on the respective ceramic green sheets using a conductive paste;
   forming a multilayer body by alternately stacking the plurality of ceramic green sheets having the first and second internal electrodes formed thereon in a thickness direction of the multilayer body;
   forming a ceramic body by sintering the multilayer body;
   forming first and second external electrodes on both end surfaces of the ceramic body so as to contact the exposed portions of the first and second internal electrodes to thereby be electrically connected to the first and second internal electrodes, respectively; and
   forming first and second plating layers enclosing the first and second external electrodes,
   wherein when a distance from one end of bands of the first or second external electrode to the other end thereof is defined as A and a distance between points at which a virtual line drawn from a point vertically spaced apart from a surface of the first or second plating layer at a point $½×A$ from one end of the bands inwardly of the ceramic body by 3 μm in a length direction of the ceramic body intersects points on the surface of the first or second plating layer is defined as B, B/A≥0.6 is satisfied.

5. The method of claim 4, wherein when one end of the bands of the first or second external electrode is defined as P, a point spaced apart from P by $1/10×A$ is defined as Q, and a point at which a virtual line vertically drawn from Q in a thickness direction of the ceramic body intersects a point on the surface of the first or second plating layer is defined as R, an angle (θ) formed by line PQ and line PR is equal to or smaller than 35 degrees.

6. The method of claim 4, wherein the multilayer body is formed to have a thickness of 80 μm or less.

7. The method of claim 4, wherein the forming of the first and second external electrodes includes:
   dipping both ends of the ceramic body in a paste to form the first and second external electrodes; and
   blowing air toward the bands of the first and second external electrodes.

8. The method of claim 7, wherein in the blowing of the air, a speed and a direction of the blown air are adjusted to control surface flatness of the bands of the first and second external electrodes and angles between the ceramic body and the first and second external electrodes.

9. A method of manufacturing a board having a multilayer ceramic capacitor embedded therein, the method comprising:
   preparing the multilayer ceramic capacitor;
   forming a cavity in the board;
   mounting the multilayer ceramic capacitor in the cavity;
   attaching a built-up film to the board and compressing the built-up film at a high temperature and a high pressure, the built-up film being formed of an epoxy material;
   forming via holes in the board such that external electrodes of the multilayer ceramic capacitor are exposed; and
   filling the via holes with a conductive material to manufacture the board having the multilayer ceramic capacitor embedded therein,
   wherein in the multilayer ceramic capacitor, when a distance from one end of bands of the first or second external electrode to the other end thereof is defined as A and a distance between points at which a virtual line drawn from a point vertically spaced apart from a surface of a first or second plating layer at a point $½×A$ from one end of the bands inwardly of a ceramic body by 3 μm in a length direction of the ceramic body intersects points on the surface of the first or second plating layer is defined as B, B/A≥0.6 is satisfied.

10. The method of claim 9, wherein when one end of the bands of the first or second external electrode is defined as P, a point spaced apart from P by $1/10×A$ is defined as Q, and a point at which a virtual line vertically drawn from Q in a thickness direction of the ceramic body intersects a point on the surface of the first or second plating layer is defined as R, an angle (θ) formed by line PQ and line PR is equal to or smaller than 35 degrees.

* * * * *